US010083591B2

(12) United States Patent
Carr et al.

(10) Patent No.: US 10,083,591 B2
(45) Date of Patent: Sep. 25, 2018

(54) TELEMETRY MONITORING SYSTEM AND A DATA RECOVERY METHOD FOR A TELEMETRY MONITORING SYSTEM (71) Applicant: Draeger Safety UK Limited, Blyth (Northumberland) (GB)

(72) Inventors: Conor Carr, Tynemouth (GB); Matthew Barnes, Newcastle Upon Tyne (GB); Steve Grainger, Tynemouth (GB)

(73) Assignee: Draeger Safety UK Limited (GB)

( * ) Notice: Subject to any disclaimer, the term of this patent is extended or adjusted under 35 U.S.C. 154(b) by 0 days.

(21) Appl. No.: 15/498,133

(22) Filed: Apr. 26, 2017

(65) Prior Publication Data

US 2017/0228997 A1    Aug. 10, 2017

Related U.S. Application Data (63) Continuation of application No. 13/904,402, filed on May 29, 2013, now Pat. No. 9,664,530.

(30) Foreign Application Priority Data

Jun. 14, 2012  (GB) .................................. 1210569.8

(51) Int. Cl.
*G06F 11/00*  (2006.01)
*G08B 21/04*  (2006.01)
(Continued)

(52) U.S. Cl.
CPC .......... *G08B 21/0453* (2013.01); *A62B 9/006* (2013.01); *G08B 21/0415* (2013.01);
(Continued)

(58) Field of Classification Search
CPC ............... A62B 9/006; G08B 21/0415; G08B 21/0453; G08B 25/002; G08B 25/016;
(Continued)

(56) References Cited

U.S. PATENT DOCUMENTS 5,291,600 A * 3/1994 Lutz .................... G06F 11/1441
714/15
5,541,579 A   7/1996 Kiernan
(Continued)

FOREIGN PATENT DOCUMENTS

WO  2011/140095  11/2011
WO  2011/144947  11/2011

*Primary Examiner* — Naomi J Small
(74) *Attorney, Agent, or Firm* — DLA Piper LLP (US)

(57) ABSTRACT

There is disclosed a telemetry monitoring system including a central monitoring unit configured to display data regarding one or more portable devices, each associated with the breathing apparatus of a user. The system further includes removable data storage connected to the central monitoring unit and configured to store system status data of the central monitoring unit as recovery data, the system status data defining an operational status of the central monitoring unit. In the event of a failure of the telemetry monitoring system, the telemetry monitoring system can be recovered by restoring the recovery data to the central monitoring unit or a replacement central monitoring unit from the removable data storage.

20 Claims, 4 Drawing Sheets (51) Int. Cl.
*H04Q 9/00* (2006.01)
*G08B 25/01* (2006.01)
*A62B 9/00* (2006.01)
*G08B 25/00* (2006.01)

(52) U.S. Cl.
CPC ............ *G08B 25/016* (2013.01); *H04Q 9/00* (2013.01); *G08B 25/002* (2013.01); *H04Q 2209/10* (2013.01); *H04Q 2209/40* (2013.01); *H04Q 2209/70* (2013.01)

(58) Field of Classification Search
CPC ...... G08B 25/001; G08B 21/02; G08B 21/18; H04Q 2209/10; H04Q 2209/70; H04Q 9/00; H04Q 2209/40; G01D 4/002
USPC ...................................... 340/870.03; 702/188
See application file for complete search history.

(56) References Cited

U.S. PATENT DOCUMENTS

| | | | | |
|---|---|---|---|---|
| 6,121,881 A * | 9/2000 | Bieback | ................. | A62B 18/08 128/201.19 |
| 7,026,928 B1 * | 4/2006 | Lane | ..................... | G08B 21/02 340/426.1 |
| 7,206,970 B1 * | 4/2007 | Lauterbach | ......... | G06F 11/2289 713/2 |
| 7,306,970 B2 | 4/2007 | Lauterbach et al. | | |
| 2004/0135693 A1 | 7/2004 | Schubert et al. | | |
| 2004/0230863 A1 * | 11/2004 | Buchhorn | ........... | G06F 11/1446 714/6.12 |
| 2006/0250224 A1 * | 11/2006 | Steffel | ................... | G01S 13/931 340/435 |
| 2006/0276166 A1 * | 12/2006 | Jenkins | ................ | G08B 25/016 455/404.1 |
| 2006/0286933 A1 * | 12/2006 | Harkins | ................... | A42B 3/30 455/41.2 |
| 2008/0007396 A1 * | 1/2008 | Parkulo | ................. | G01S 13/878 340/539.2 |
| 2008/0023002 A1 * | 1/2008 | Guelzow | ................ | A42B 3/042 128/201.24 |
| 2008/0077326 A1 * | 3/2008 | Funk | .................... | G01C 21/165 701/500 |
| 2008/0172426 A1 * | 7/2008 | Patel | .................... | G06F 11/1435 |
| 2008/0185432 A1 * | 8/2008 | Caballero | ........... | G06F 11/0742 235/435 |
| 2009/0018875 A1 * | 1/2009 | Monatesti | .............. | G06Q 10/06 705/7.26 |
| 2009/0019291 A1 * | 1/2009 | Murray | ................... | G06F 21/10 713/193 |
| 2010/0061662 A1 | 3/2010 | Hubner et al. | | |
| 2010/0081411 A1 | 4/2010 | Montenero | | |
| 2011/0026069 A1 * | 2/2011 | Jesudason | ............ | G06F 3/1204 358/1.15 |
| 2011/0112474 A1 * | 5/2011 | Bochenko | ............ | A61M 39/02 604/68 |
| 2012/0136232 A1 * | 5/2012 | Jeong | ................... | A61B 5/0002 600/388 |

\* cited by examiner

TELEMETRY MONITORING SYSTEM AND A DATA RECOVERY METHOD FOR A TELEMETRY MONITORING SYSTEM

CROSS REFERENCE TO RELATED APPLICATIONS

This application is a continuation of U.S. Ser. No. 13/904,402 filed May 29, 2013, which claims priority to UK Patent Application No. 1210569.8 filed on Jun. 14, 2012, the entire content of which is incorporated herein by reference.

BACKGROUND

The invention relates to a telemetry monitoring system and a data recovery method for a telemetry monitoring system.

Firefighters and other rescue personnel are often required to enter hazardous environments, such as burning buildings. In such circumstances, the firefighter is provided with self-contained breathing apparatus (SCBA) which provides breathable gas to the firefighter.

Breathing apparatus may be provided with an electronic monitoring unit which provides information to the firefighter. This information may include the amount of breathable gas remaining, cylinder pressure, time-to-whistle (TTW), and temperature, for example. This information can be monitored by the firefighter to allow them to work safely and within the restrictions of the breathing apparatus. The monitoring unit may also perform the functions of an automatic distress signal unit (ADSU), otherwise referred to as a personal alert safety system (PASS). Such devices are provided with a motion sensor, a panic button, and an alarm. If the device does not detect motion within a pre-determined period of time then an audible pre-alarm is activated. If this pre-alarm is not cancelled by either movement or by pressing a button within a pre-determined period of time then an audible full-alarm is activated. This indicates to others in the vicinity that the wearer is in distress. The panic button can also be manually activated to sound the alarm if required. British Home Office Standard JCDD/38 specifies the requirements of an ADSU.

To ensure the safety of a firefighter within a hazardous environment, it is also desirable to monitor their status from outside of the incident. This is typically the responsibility of a designated entry control officer.

Typically, the entry control officer uses an entry control board (ECB) to record information regarding the firefighters. Each firefighter who enters the incident wearing breathing apparatus is recorded on the ECB. This may be achieved by removing an identification tag (or tally) from their breathing apparatus and slotting the tag into the board. The time the firefighter entered the incident is written next to their identification tag and their "time to whistle" is manually calculated based on the capacity of their cylinder of breathable gas.

More recently, electronic entry control boards have been implemented. Such electronic boards are able to remotely monitor the breathing apparatus of the firefighter from outside of the incident. Each firefighter is provided with a radio unit, which is connected to the electronic monitoring unit and which transmits telemetry data to the ECB. The telemetry data includes data such as the amount of breathable gas remaining, cylinder pressure, time-to-whistle (TTW), and temperature. Accordingly, the information displayed on the entry control board is "live" data and is not based on calculations made at the time of entry. The telemetry data may also include any pre-alarms or full-alarms initiated by the ADSU/PASS. Also, the entry control officer may relay information to the firefighter using the entry control board. For example, the entry control officer may transmit an evacuation signal to the firefighter which informs the firefighter to exit the incident.

While such telemetry monitoring systems provide far superior monitoring of firefighters, they are susceptible to hardware and software failures. Such failures prevent the entry control officer from being able to monitor the firefighters from outside of the incident. Consequently, the firefighter is then solely responsible for monitoring the status of their breathing apparatus. For that reason, telemetry monitoring systems are usually regarded as an additional safety feature and are not intended to replace any other safety feature or procedure.

The possible failure of the telemetry monitoring system is generally seen as an acceptable risk. Nevertheless, it is desirable to be able to quickly and reliably recover the telemetry monitoring system in the event of a failure so as to continue monitoring the firefighters.

SUMMARY OF THE INVENTION

An exemplary embodiment of the present invention comprises a method of wirelessly monitoring a plurality of users wearing breathing apparatus comprising the steps of wirelessly monitoring a plurality of portable devices, each comprising a personal alert safety system and each associated with a breathing apparatus of a user, using a central monitoring unit which wirelessly receives telemetry data containing information regarding the status of the breathing apparatus and/or the user from each of the portable devices, displaying the telemetry data received by the central monitoring unit from each of the plurality of portable devices at the central monitoring unit, storing system status data of the central monitoring unit as recovery data in removable data storage removably connected to the central monitoring unit, wherein the status data comprises the telemetry data received by the central monitoring unit from each of the plurality of portable devices; and restoring the recovery data from the removable data storage to the original central monitoring unit or a replacement central monitoring unit in the event of a failure of the telemetry monitoring system.

Another exemplary embodiment of the present invention comprises a telemetry monitoring system comprising a central monitoring unit configured to display data regarding one or more portable devices each associated with a breathing apparatus of a user and removable data storage removably connected to the central monitoring unit and configured to store system status data of the central monitoring unit as recovery data, the system status data defining an operational status of the central monitoring unit wherein, in the event of a failure of the telemetry monitoring system, the telemetry monitoring system can be recovered by restoring the recovery data to the central monitoring unit or a replacement central monitoring unit from the removable data storage.

Another exemplary embodiment of the present invention comprises a method for data recovery in a telemetry monitoring system, wherein the telemetry monitoring system comprises a central monitoring unit configured to display data regarding one or more portable devices each associated with breathing apparatus of a user, the method comprising the steps of storing system status data of the central monitoring unit as recovery data in removable data storage removably connected to the central monitoring unit, the system status data defining an operational status of the central monitoring unit and restoring the recovery data from the removable data storage to the central monitoring unit or a replacement central monitoring unit in the event of a failure of the telemetry monitoring system.

BRIEF DESCRIPTION OF THE DRAWINGS

For a better understanding of the invention and to show more clearly how it may be carried into effect, exemplary embodiments of the invention will now be described, by way of example, with reference to the accompanying drawings, in which.

DETAILED DESCRIPTION

In accordance with an exemplary embodiment of the invention there is provided a telemetry monitoring system comprising: a central monitoring unit configured to display data regarding one or more portable devices each associated with breathing apparatus of a user; and removable data storage removably connected to the central monitoring unit and configured to store system status data of the central monitoring unit as recovery data, the system status data defining an operational status of the central monitoring unit. In the event of a failure of the telemetry monitoring system, the telemetry monitoring system can be recovered by restoring the recovery data to the central monitoring unit or a replacement central monitoring unit from the removable data storage.

In other words, the system status data defines the information being used by the central monitoring unit at a particular time in order to allow the central monitoring unit to operate as it is doing at that time. The system status data therefore allows the operation of the central monitoring unit to be recreated in the event of a failure. That is, the system status data allows the central monitoring unit (or its replacement) to display at least some of the data displayed (or displayable) by the central monitoring unit prior to the failure.

The system status data may be considered as the information which is displayed or which is displayable by the central monitoring unit. Alternatively or in addition, the system status data may comprise information which is used in processes performed by the central monitoring unit in order to be able to display such information.

The telemetry monitoring system may further comprise the one or more portable devices. The or each portable device may comprise a PASS or ADSU device.

The system status data may comprise telemetry data received at the central monitoring unit from the portable devices and/or instruction data transmitted from the central monitoring unit to the portable devices.

The system status data may also comprise information which is generated at the central monitoring unit and exists solely at the central monitoring unit.

The telemetry data may contain information regarding the status of the breathing apparatus and/or the user. For example, the telemetry data may provide cylinder pressure, ambient temperature, time of whistle, time to whistle, elapsed time, breathing rate, heart rate, temperature of firefighter, position, activation of distress alarm, etc.

The central monitoring unit may comprise an integrated data storage unit, such as a hard disk drive, which is configured to store a log file in which the system status data is recorded periodically, the log file forming recovery data. In the event of a failure of the telemetry monitoring system, the telemetry monitoring system can be recovered by restoring the recovery data to the central monitoring unit from the integrated data storage unit.

The removable data storage may comprise one or more removable storage units. The or each removable storage unit may be removably connected to the central monitoring unit. For example, the or each removable storage unit may comprise one or more USB flash drives.

The central monitoring unit may be configured to store at least some of the system status data on a removable storage unit directly (or indirectly) removably connected to the central monitoring unit.

The telemetry monitoring system may further comprise a wireless communication unit removably connected to the central monitoring unit and configured to perform wireless communication with the or each portable device.

The wireless communication unit may comprise a removable storage unit. In this case, the removable storage unit may be integrated in the wireless communication unit, but removable from the central monitoring unit by virtue of the wireless communication unit being removably connected to the central monitoring unit.

The wireless communication unit may be configured to store at least some of the system status data on the removable storage unit.

For example, the central monitoring unit may periodically copy the system status data to the removable storage units of the central monitoring unit and wireless communication unit. This may be achieved by periodically copying the log file stored on the integrated data storage unit to the or each removable storage unit.

Only a portion of the log file may be copied to the removable storage units, particularly the removable storage unit of the wireless communication unit. The portion of the log file copied to the or each removable storage unit may provide the minimum information to allow the telemetry monitoring system to recover from the failure.

Alternatively, the wireless communication unit may be configured to store in its removable storage unit only the latest instance of system status data. In other words, the wireless communication unit may overwrite the stored data with the most recent iteration.

The central monitoring unit may be configured to identify recovery data upon start up of the central monitoring unit and, if instructed, restore the recovery data to the central monitoring unit. The recovery data may be restored to the central monitoring unit through a single button press to accept restoration. The central monitoring unit may be a replacement central monitoring unit.

The central monitoring unit may comprise an electronic entry control board.

In accordance with another aspect of the invention there is provided a data recovery method for a telemetry monitoring system, the telemetry monitoring system comprising: a central monitoring unit configured to display data regarding one or more portable devices each associated with breathing apparatus of a user. The method comprising: storing system status data of the central monitoring unit as recovery data in removable data storage removably connected to the central monitoring unit, the system status data defining an operational status of the central monitoring unit; and in the event of a failure of the telemetry monitoring system, restoring the recovery data from the removable data storage to the central monitoring unit or a replacement central monitoring unit.

The system status data may comprise telemetry data received at the central monitoring unit from the portable devices and/or instruction data transmitted from the central monitoring unit to the portable devices.

The system status data may also comprise information which is generated at the central monitoring unit and exists solely at the central monitoring unit.

The central monitoring unit may comprise an integrated data storage unit, such as a hard disk drive. The method may further comprise periodically recording the system status data in a log file stored on the integrated data storage unit as recovery data; and in the event of a failure of the telemetry monitoring system, restoring the recovery data to the central monitoring unit from the integrated data storage unit.

The removable data storage may comprise one or more removable storage units. The or each removable storage unit may be removably connected to the central monitoring unit. For example, the or each removable storage unit may comprise one or more USB flash drives.

The central monitoring unit may store at least some of the system status data on a removable storage unit directly (or indirectly) removably connected to the central monitoring system.

A wireless communication unit may be provided which is removably connected to the central monitoring unit and configured to perform wireless communication with the portable devices.

The wireless communication unit may comprise a removable storage unit. In this case, the removable storage unit may be integrated in the wireless communication unit, but removable from the central monitoring unit by virtue of the wireless communication unit being removably connected to the central monitoring unit.

The data recovery method may further comprise the wireless communication unit storing at least some of the system status data on the removable storage unit.

The data recovery method may further comprise identifying recovery data upon start up of the central monitoring unit and, if instructed, restoring the recovery data to the central monitoring unit.

Figure 1:
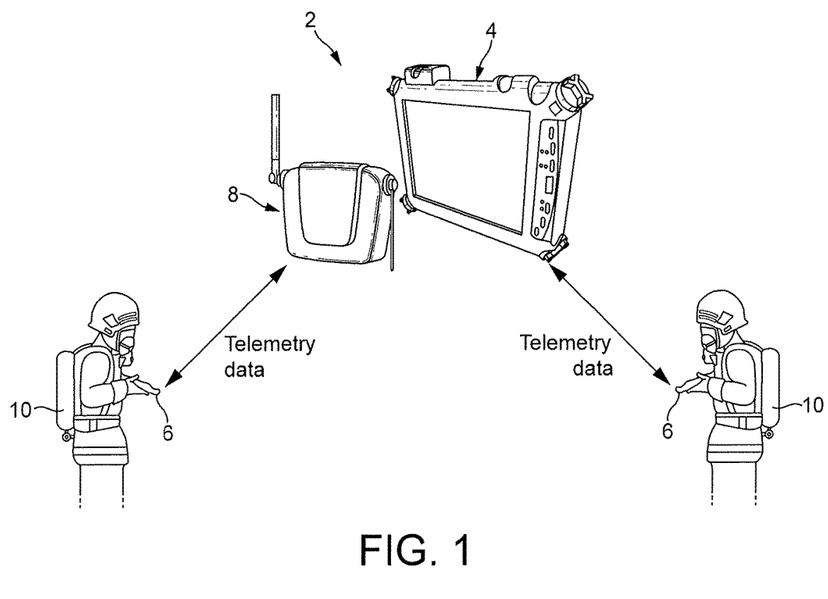
FIG. 1 is a schematic view of a telemetry monitoring system according to an exemplary embodiment of the invention.

Referring to FIG. 1, there is shown a telemetry monitoring system 2 in accordance with an embodiment of the invention. The telemetry monitoring system 2 comprises a central monitoring unit 4, a wireless communication unit 8 removably connected to the central monitoring unit 4, and a plurality of portable devices 6; each associated with a separate firefighter wearing breathing apparatus 10. The central monitoring unit 4 and portable devices 6 are configured to communicate wirelessly with one another via the wireless communication unit 8. This arrangement allows the firefighters to be remotely monitored from outside an incident.

Figure 2:
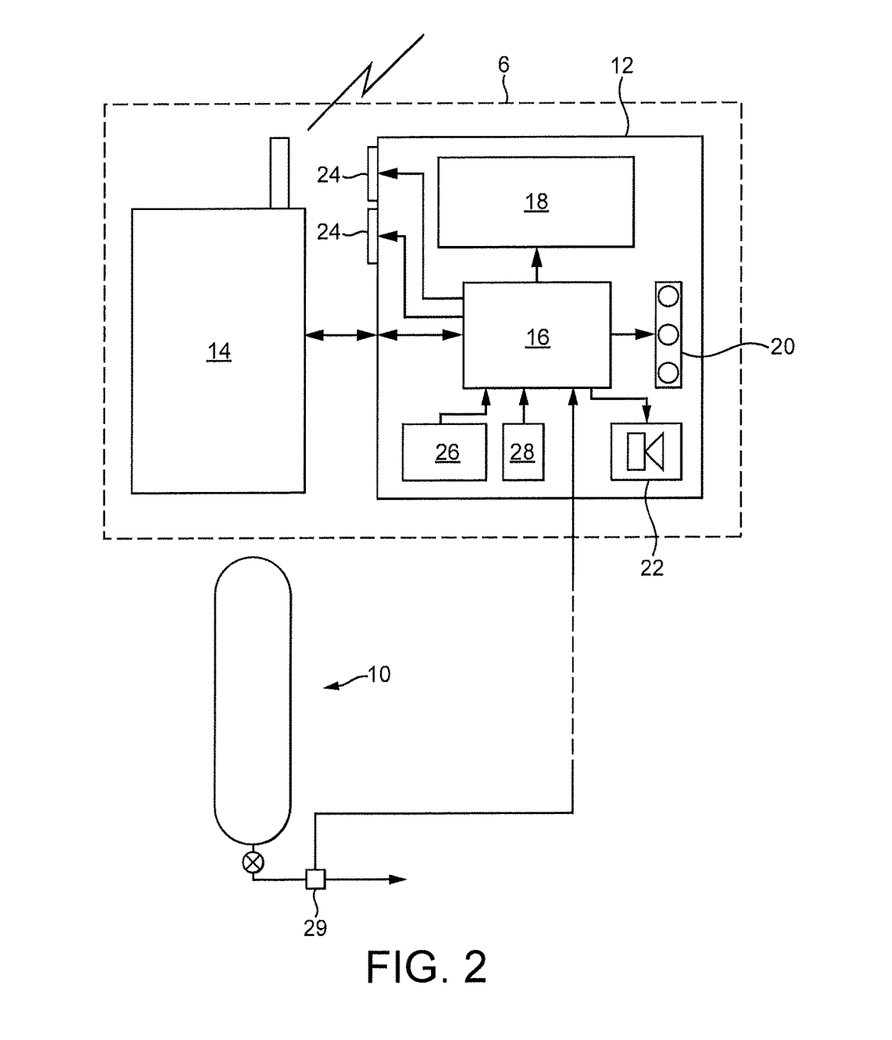
FIG. 2 schematically shows a portable device according to an exemplary embodiment of the invention.

As shown in FIG. 2, each portable device 6 comprises an electronic portable monitoring unit 12, and a radio (or telemetry) module 14. In this embodiment the portable monitoring unit 12 and radio module 14 are distinct units that are connected by a physical wired link. The portable monitoring unit 12 is in the form of a hand-held device and the radio module 14 is incorporated into the harness of the breathing apparatus 10. However, in other embodiments the two units may be integrated or the units may communicate with each other wirelessly via a Bluetooth® link, for example. The radio module 14 is capable of wirelessly transmitting data to the central monitoring unit 4 (via the wireless communication unit 8) and in other embodiments may also be capable of transmitting speech to other portable devices 6 and/or to the central monitoring unit 4.

The portable monitoring unit 12 comprises a central processor 16 that is connected to an LCD display 18, a plurality of LEDs 20, a sounder 22 and a number of push buttons 24. The processor 16 is also connected via a wired link to the radio module 14. The processor 16 is further connected to a number of sensors for monitoring parameters of any combination of the breathing apparatus 10, the firefighter, or the ambient surroundings. The sensors may be directly incorporated into the portable monitoring unit 12, or may be external and connected to the portable monitoring unit 12 by a wired or wireless, such as Bluetooth®, link. In this particular embodiment the portable monitoring unit 12 includes a motion detector 26 and a temperature sensor 28 connected to the processor 16. The portable monitoring unit 12 is connected to an external electronic pressure transducer 29 that is arranged to measure the pressure of the cylinder of breathable gas of the breathing apparatus 10. It should be appreciated that in other embodiments the portable monitoring unit 12 may incorporate an electronic pressure transducer and a pneumatic line from the cylinder may be connected to the portable monitoring unit 12 in order to measure the pressure.

The processor 16 is arranged to continuously monitor the gas pressure and temperature and these parameters can be displayed to the wearer on the LCD display 18. The wearer can "toggle" through the various parameters by using the buttons 24. In this embodiment the processor 16 is also configured to calculate the time-to-whistle (TTW) and this parameter can also be displayed. If the pressure drops below a critical threshold the processor 16 may activate one or more of the LEDs 20 in order to warn the wearer. Further, the portable monitoring unit 12 is configured to function as an ADSU (or PASS). The processor 16 continuously monitors the movement of the wearer using the motion detector 26 and if motion is not detected for a pre-determined period of time then the sounder 22 emits a pre-alarm and a combination of LEDs 20 is activated. A message may also be displayed on the LCD display 18. This pre-alarm can be cancelled by the wearer pressing a combination of buttons 24 or by moving. If the pre-alarm is not cancelled within a pre-set period of time then the sounder 22 emits a full-alarm and a different combination of LEDs 20 is activated. The full-alarm can also be activated by pressing a panic button 24.

Figure 3:
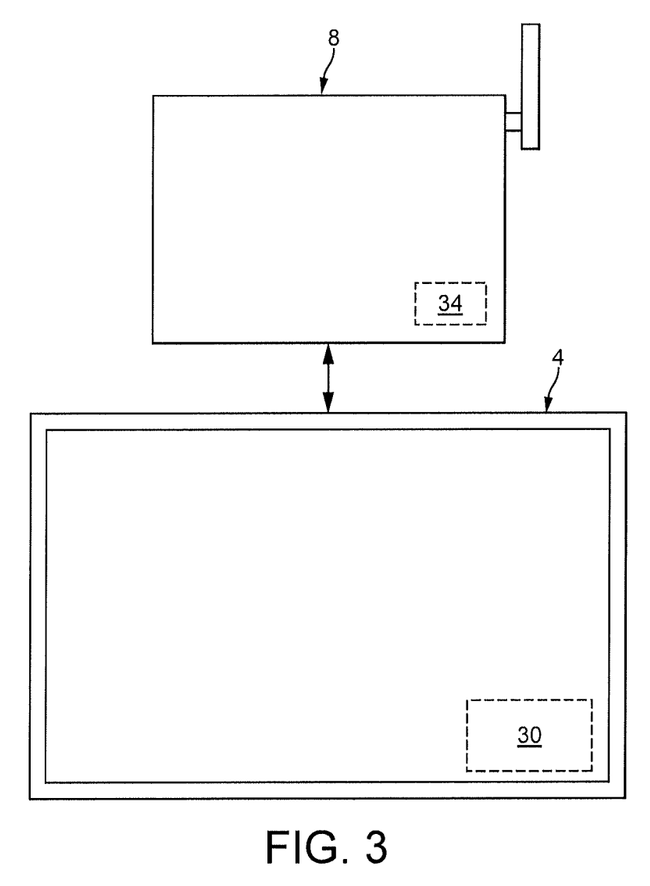
FIG. 3 schematically shows a central monitoring unit and a wireless communication unit according to an exemplary embodiment of the invention.

With reference to FIG. 3, the central monitoring unit 4 in this embodiment is a "rugged" tablet PC, having a touchscreen, that is loaded with proprietary firefighter monitoring software. A wireless communication unit 8 is removably connected to the central monitoring unit 4 such that the central monitoring unit 4 can wirelessly communicate with the portable devices 6. In this embodiment the wireless communication unit 8 is connected to the central monitoring unit 4 via a wired connection. The communication unit 8 is also physically connected to the central monitoring unit 4 by a mounting mechanism. The central monitoring unit 4 includes a storage device in the form of a hard-disk drive 30 and is further provided with a removable storage device 32, such as a USB flash drive, that is removably connected to the tablet PC via a USB port. The communication unit 8 is also provided with an in-built storage device 34 that may be solid-state, for example. In other embodiments the storage device 34 may be removably connected to the wireless communication unit 8. In this embodiment the data storage device 34 of the wireless communication unit 8 may be regarded as a removable storage unit since the wireless communication unit 8 is removably connected to the central monitoring unit 4.

In use, each firefighter is provided with a portable device 6 and the entry control officer is provided with the central monitoring unit 4 and wireless communication unit 8. Each firefighter then registers their portable device 6 with the central monitoring unit 4 so that the central monitoring unit 4 is able to monitor the specific portable device 6 (and hence the firefighter). This may be accomplished in one of any number of ways. In this particular embodiment the firefighter presses a combination of buttons 24 on their portable monitoring unit 12 which instructs the radio module 14 to wirelessly transmit by radio a log-on message. This log-on message is received by the wireless communication unit 8 and transmitted to the central monitoring unit 4. The log-on message contains information that uniquely identifies the portable device 6 and the firefighter monitoring software running on the central monitoring unit 4 registers that the particular portable device 6 should now be monitored. After log-on, the screen of the central monitoring unit 4 displays the particular firefighter (identified by the portable device 6 logged on) and displays various information associated with the firefighter/portable device 6. In other embodiments log-on may be achieved by transmitting a general message from the central monitoring unit 4 to log-on all portable devices within range, or an RFID tag associated with the portable device 6 may be scanned at the central monitoring unit 4 which results in a specific log-on message being transmitted from the central monitoring unit 4 to the specific portable device 6.

The portable devices 6 continuously monitor various parameters, such as pressure and temperature, and the processor 16 may calculate parameters such as time-to-whistle. At periodic intervals, the central monitoring unit 4 polls each of the portable devices 6 logged on by instructing the wireless communication unit 8 to transmit a polling message to the individual portable devices 6. The radio module 14 of the portable device 6 receives this polling message and transmits it to the processor 16 of the portable monitoring unit 12. In response to this message, the processor 16 instructs the radio module 14 to wirelessly transmit a packet of telemetry data. The packet of telemetry data identifies the specific portable device 6, and includes the various parameters being monitored including the status of the ADSU (i.e. no alarm, pre-alarm, full-alarm), cylinder pressure, TTW, and temperature. The packet of telemetry data is received by the wireless communication unit 8 which transmits the data to the central monitoring unit 4. The central monitoring unit 4 then uses this data to update the information regarding the particular firefighter on the screen. Thus, the central monitoring unit 4 provides up-to-date information on the firefighters. Further, if the ADSU of the portable device 6 enters into a pre-alarm or a full-alarm mode, this is immediately wirelessly transmitted to the central monitoring unit 6. This immediately notifies the entry control officer that a firefighter is in distress.

It is also possible to transmit information from the central monitoring unit 4 to the portable devices 6. For example, by manipulating the touch screen of the central monitoring unit 4 a wireless evacuation message can be sent to a particular firefighter/portable device 6 via the wireless communication unit 8 in order to activate an evacuation alarm on the ADSU of the portable monitoring unit 12. It may also be possible to send an evacuation alarm to all portable devices 6 logged onto the central monitoring unit 4.

At any time, the information being used and/or displayed by the central monitoring unit 4 forms system status data. That is, the system status data comprises all of the information allowing the central monitoring unit 4 to function (as perceived by the entry control officer) at that time. The system status data may be considered as the information which is displayed or which is displayable by the central monitoring unit 4 at that time. Alternatively or in addition, the system status data may comprise information which is used in processes performed by the central monitoring unit 4 in order to be able to display such information.

Accordingly, the system status data may comprise the latest telemetry data received from the portable devices 6. This may be represented as the raw data received from the portable devices and/or the information which is displayed by the central monitoring unit 4. For example, the system status data may define which portable devices are logged-on, the status of the breathing apparatus/firefighter/ambient surroundings, the status of the ADSU, etc.

The system status data may also comprise instruction data transmitted from the central monitoring unit 4 to the portable devices 6 which is viewable at the central monitoring unit 4. For example, the instruction data may include log-on instructions or acknowledgements, polling requests, and evacuation messages.

In addition, the system status data may comprise information which is generated at the central monitoring unit 4 and exists solely at the central monitoring unit 4. For example, the entry control officer may group individual firefighters into teams on the central monitoring unit 4. Such information is used by the central monitoring unit 4 (for display purposes) but is not transmitted to the portable devices 6.

The system status data is periodically written to the storage device 30 which is integrated in the central monitoring unit 4. The system status data is stored in a log file on the integrated storage device 30 with a time-stamp and/or in chronological order. Each entry in the log file therefore provides a snapshot of the operational status of the central monitoring unit 4 at that time.

At periodic intervals, the log file stored in the integrated storage device 30 of the central monitoring unit 4 is written to the removable storage device 32. The log file stored in the integrated data storage device 30 is also periodically written to the storage device 34 of the wireless communication unit 8. In this embodiment the complete log file is periodically written to both the removable storage device 32 and the storage device 34 of the wireless communication unit 8. However, it should be appreciated that in other embodiments only a skeleton portion of the log file may be written.

In the event of a software failure or hardware failure of the central monitoring unit 4 or wireless communication unit 8, the data displayed by the central monitoring unit 4 and the configuration of the telemetry system 2 will be lost.

However, the telemetry monitoring system 2 may be recovered by using the recovery data stored in one of the storage devices 30, 32 and 34, as shown in Table 1 below.
CMU=central monitoring unit 4
WCU=wireless communication unit 8

TABLE 1

| | PROBLEM | RECOVERY SOLUTION |
|---|---|---|
| Software failure | Operating system failure | Restart software and recover log data from integrated CMU storage device 30. |
| | Firefighter monitoring software failure | Restart software and recover log data from integrated CMU storage device 30. |
| Hardware failure | WCU failure | Replace WCU 8 and recover log data from storage device 30. |
| | CMU failure | Remove storage device 32, insert storage device 32 into replacement CMU 4, start software and recover log data from storage device 32; OR Remove WCU 8, connect WCU 8 to replacement CMU 4, start software and recover log data from storage device 34. |

As shown above, the log file stored in the integrated data storage device 30 can be used to restore the telemetry monitoring system 2 where there is a software failure or the wireless communication unit 8 fails. Where there is a software failure, the central monitoring unit 4 can normally be restarted and restored to the previous configuration by using the log file from the integrated data storage device 30. Similarly, where the wireless communication unit 8 fails, the same central monitoring unit 4 can be restarted with a replacement wireless communication unit 8 connected. The central monitoring unit 4 can then be restored to the previous configuration by using the log file from the integrated data storage device 12.

However, where the central monitoring unit 4 itself fails (i.e. the integrated data storage device 30 fails) or the fault is more serious, it may be necessary to replace the entire central monitoring unit 4. Consequently, it is not then possible to restore the telemetry monitoring system 2 using the log file from the integrated data storage device 30. Instead, the removable storage device 32 can be removed from the central monitoring unit 4 and inserted into a replacement central monitoring unit 4 (possibly also using a replacement wireless communication unit 8). The replacement central monitoring unit 4 can then be restored to the previous configuration (of the previous central monitoring unit 4) by using the log file from the removable storage device 32.

The storage device 34 of the wireless communication unit 8 provides a third backup. The storage device 34 may contain only essential information from the log file (for example, only the latest entry of system status data or only the most important aspects of the system status data) which allows the entry control officer to continue to monitor the firefighters whilst still maintaining the important information. The storage device 34 of the wireless communication unit 8 therefore allows the wireless communication unit 8 to be transferred to a replacement central monitoring unit 4 to overcome to a failure of the central monitoring unit 4.

Figure 4:
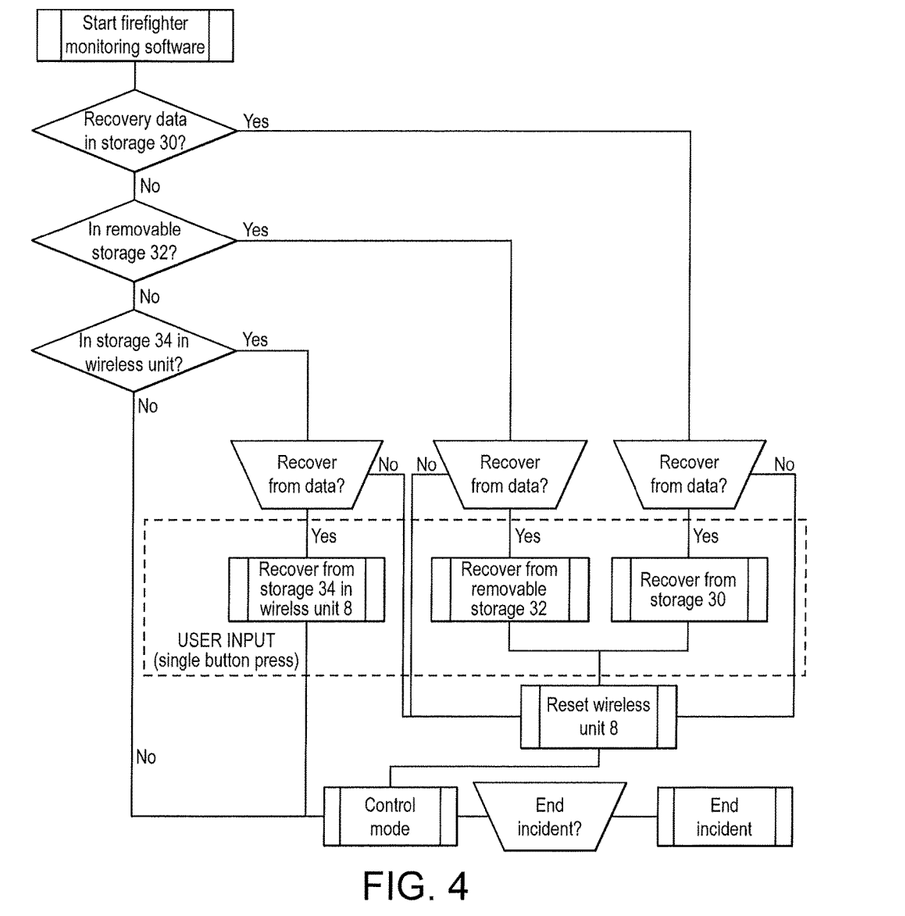
FIG. 4 is a flow chart of a data recovery method for the telemetry monitoring system of FIG. 1.

FIG. 4 shows a flowchart of the data recovery process used by the telemetry monitoring system 2.

On initiation of the entry control software, the software detects whether there is any recovery data available in any of the storage devices 30, 32, 34.

Specifically, the entry control software initially checks the integrated data storage device 30 of the central monitoring unit 4. If the log file of the integrated data storage device 30 does not contain any recovery data, the software proceeds to check the removable storage device 32. Again, if the removable storage device 32 does not contain any recovery data, the software proceeds to check the storage device 34 of the wireless communication unit 8.

If no recovery data is available to the entry control software, the telemetry monitoring system 2 may be being used for the first time. Accordingly, the entry control software enters a control mode where the telemetry monitoring system 2 is fully operational.

On the other hand, if recovery data is available in one of these sources, the operator (i.e. the entry control officer) is asked whether they wish to recover the telemetry monitoring system 2 from the recovery data. This is achieved quickly and easily using a single button press. The recovery data available to the entry control software may be from a previous incident and thus the entry control officer may not wish to recover the data.

Where the entry control officer wishes to recover the data, the recovery data is restored and the entry control software enters the control mode where the telemetry monitoring system 2 is fully operational. Where recovery data is available from the integrated data storage device 30 or the removable data storage device 32, the entry control software resets the wireless communication unit 8 before entering the control mode.

Unless otherwise specified, the recovered data is the latest entry in the log file. Accordingly, the recovery of this data allows the central monitoring unit 4 (or its replacement) to be restored to the state of operation prior to the failure. Consequently, the central monitoring unit 4 (or its replacement) is able to display the same information (although potentially only the most important information) to the entry control officer.

As described, the telemetry monitoring system 2 is provided with a three-tiered backup system which allows the system to recover from any type failure. The telemetry monitoring system is therefore robust and secure, providing a system which the entry control officer and the firefighters can rely on. In addition, recovery of the system is both quick and simple with the entry control officer confirming restoration through a single button press.

Although the telemetry monitoring system has been described as being used by firefighters, it may have other applications. In particular, the telemetry monitoring system may be used by any rescue personnel using breathing apparatus and also in underwater applications. The telemetry data may also be derived from other sources and is not necessarily limited to breathing apparatus.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

The invention claimed is:

1. A telemetry monitoring system comprising:
a central monitoring unit configured to:
log-on one or more portable devices each associated with breathing apparatus of a user;
monitor one or more logged-on portable devices during operation of the central monitoring unit;
periodically store a configuration of the telemetry system by storing system status data of the central monitoring unit as recovery data in a removable data storage connected to the central monitoring unit; wherein the system status data provides a snapshot of a state of operation of the central monitoring unit;
wherein upon start up, the central monitoring unit is configured to:
check the removable data storage for recovery data associated with a previous configuration of the telemetry system prior to a failure; and
restore the central monitoring unit to the previous configuration to continue monitoring after the failure of at least one of one or more portable devices logged-on in the previous configuration.

2. A telemetry monitoring system according to claim 1, further comprising one or more portable devices.

3. A telemetry monitoring system according to claim 2, wherein each of the one or more portable devices comprises a personal alert safety system device.

4. A telemetry monitoring system according to claim 1, wherein the system status data comprises data generated at the central monitoring unit.

5. A telemetry monitoring system according to claim 4, wherein the system status data comprises data generated at the central monitoring unit including information regarding the selection and/or allocation of users into groups, and/or information regarding which of the portable devices are logged on to the central monitoring unit.

6. A telemetry monitoring system according to claim 1, wherein the system status data comprises telemetry data received at the central monitoring unit from the one or more portable devices and/or instruction data transmitted from the central monitoring unit to the one or more portable devices, wherein the telemetry data contains information regarding the status of the breathing apparatus and/or the user.

7. A telemetry monitoring system according to claim 1, further comprising a wireless communication unit removably connected to the central monitoring unit and configured to perform wireless communication with each of the one or more portable devices; and
wherein the removable data storage comprises a removable storage unit of the wireless communication unit.

8. A telemetry monitoring system comprising:
a central monitoring unit configured to monitor one or more portable devices each associated with breathing apparatus of a user during operation of the central monitoring unit;
a wireless communication unit removably connected to the central monitoring unit and configured to perform wireless communication with the portable devices to receive telemetry data from the portable devices during operation;
wherein the central monitoring unit is configured to store at periodic times, in an integrated storage unit of the central monitoring unit, system status data used by the central monitoring unit at the respective time which provides a snapshot of the operational status of the central monitoring unit at that time;
wherein the wireless communication unit further comprises a storage unit configured to periodically store the system status data of the central monitoring unit as recovery data;
wherein upon start up, the central monitoring unit is configured to:
check the storage unit of the wireless communication unit for recovery data associated with a time prior to a failure; and
restore the recovery data to the central monitoring unit to recreate an operational status prior to the failure to enable continued monitoring of the one or more portable devices after the failure.

9. A telemetry monitoring system according to claim 8, wherein the storage unit of the wireless communication unit is removable from the wireless communication unit.

10. A telemetry monitoring system according to claim 8, wherein the central monitoring unit is configured to store the system status data in the integrated storage unit as a log file, the log file forming integrated recovery data; and
wherein, upon start up, the central monitoring unit is configured to:
check the integrated storage unit for integrated recovery data associated with a time prior to a failure; and
restore the integrated recovery data to the central monitoring unit to recreate an operational status prior to the failure to enable continued monitoring of one or more portable devices after the failure.

11. A telemetry monitoring system according to claim 8, further comprising one or more portable devices.

12. A telemetry monitoring system according to claim 11, wherein each of the one or more portable devices comprises a personal alert safety system device.

13. A telemetry monitoring system according to claim 8, wherein the system status data comprises data generated at the central monitoring unit.

14. A telemetry monitoring system according to claim 13, wherein the system status data comprises data generated at the central monitoring unit including information regarding the selection and/or allocation of users into groups, and/or information regarding which of the portable devices are logged on to the central monitoring unit.

15. A telemetry monitoring system according to claim 8, wherein the system status data comprises telemetry data received at the central monitoring unit from the one or more portable devices and/or instruction data transmitted from the central monitoring unit to the one or more portable devices, wherein the telemetry data contains information regarding the status of the breathing apparatus and/or the user.

16. A central monitoring unit configured to monitor one or more portable devices of a telemetry monitoring system each associated with a breathing apparatus of a user;
wherein the central monitoring unit is configured to:
check upon start up for recovery data associated with operation of the central monitoring unit or a like central monitoring unit in a previous configuration at a time prior to a failure;
restore recovery data identified upon start up to the central monitoring unit, to thereby restore the central monitoring unit to the previous configuration;

wherein the central monitoring unit is configured to check for the recovery data upon start up in:
- an integrated storage unit of the central monitoring unit;
- a storage unit of a wireless communication unit when connected to the central monitoring unit;
- a removable data storage when connected to the central monitoring unit;

thereby permitting recovery of a previous configuration of the central monitoring unit or a like central monitoring unit after each of;
- a hardware failure of a like central monitoring unit;
- a software failure of the central monitoring unit or a like central monitoring unit;
- a failure of a wireless communication unit associated with the previous configuration.

17. A central monitoring unit according to claim 16, wherein the central monitoring unit is configured to continue to monitor one or more portable devices that were monitored in the previous configuration, after the recovery data is restored.

18. A central monitoring unit according to claim 16, wherein the central monitoring unit is configured to store at periodic times system status data used by the central monitoring unit at the respective time as recovery data to provide a snapshot of the operational status of the central monitoring unit at that time;

wherein the central monitoring unit is configured to store the system status data in each of:
- an integrated storage unit of the central monitoring unit;
- a storage unit of a wireless communication unit when connected to the central monitoring unit;
- a removable data storage when connected to the central monitoring unit;

thereby permitting recovery of a previous configuration of the central monitoring unit to the central monitoring unit or a like central monitoring unit after each of;
- a hardware failure of the central monitoring unit;
- a software failure of the central monitoring unit; and
- a failure of a wireless communication unit associated with the previous configuration.

19. A telemetry monitoring system comprising a central monitoring unit according to claim 16 and a wireless communication unit removably connected to the central monitoring unit and configured to perform wireless communication with each of the one or more portable devices.

20. A telemetry monitoring system according to claim 18, wherein the removable data storage comprises a removable storage unit of the wireless communication unit.

* * * * *